US008774799B2

(12) United States Patent
Kim et al.

(10) Patent No.: US 8,774,799 B2
(45) Date of Patent: Jul. 8, 2014

(54) SCANNING NEIGHBORING BASE STATIONS IN WIRELESS ACCESS SYSTEM

(75) Inventors: Yong Ho Kim, Bucheon-si (KR); Ki Hyoung Cho, Anyang-si (KR)

(73) Assignee: LG Electronics Inc., Seoul (KR)

(*) Notice: Subject to any disclaimer, the term of this patent is extended or adjusted under 35 U.S.C. 154(b) by 159 days.

(21) Appl. No.: 13/425,333

(22) Filed: Mar. 20, 2012

(65) Prior Publication Data

US 2012/0178446 A1  Jul. 12, 2012

Related U.S. Application Data

(63) Continuation of application No. 12/813,427, filed on Jun. 10, 2010, now Pat. No. 8,175,595, which is a continuation of application No. 11/695,183, filed on Apr. 2, 2007, now Pat. No. 7,751,817, which is a continuation of application No. 11/146,530, filed on Jun. 6, 2005, now Pat. No. 7,460,867.

(30) Foreign Application Priority Data

Jun. 7, 2004  (KR) .................. 10-2004-0041541
Jun. 22, 2004  (KR) .................. 10-2004-0046708

(51) Int. Cl.
*H04W 48/16* (2009.01)

(52) U.S. Cl.
USPC ............... 455/434; 455/161.1; 455/161.3

(58) Field of Classification Search
USPC .......... 455/115.1–115.3, 116.1, 116.3, 160.1, 455/161.1, 133, 135, 226.1–226.2, 434, 455/436–439, 450, 452.1–452.2; 370/252, 370/331, 332
See application file for complete search history.

(56) References Cited

U.S. PATENT DOCUMENTS 5,175,867 A   12/1992  Wejke et al.
5,317,623 A    5/1994  Sakamoto et al.
(Continued)

FOREIGN PATENT DOCUMENTS

AU  2005-0251635  12/2005
CN      1183700   6/1998
(Continued)

OTHER PUBLICATIONS

I. Kitroser, "IEEE 802. 16e Handoff Draft", IEEE 802.16 Broadband Wireless Access Working Group, IEEE C802.16e-03/20r1, Mar. 2003.

(Continued)

*Primary Examiner* — Cong Tran
(74) *Attorney, Agent, or Firm* — Lee, Hong, Degerman, Kang & Waimey

(57) ABSTRACT

A method of scanning neighboring base stations for measuring channel quality in a wireless communication system includes receiving information associated with at least one neighboring base station; transmitting a scanning request message including parameters related to a requested scan duration, a requested interleaving interval and a requested scan iteration; and receiving a scanning response message in response to the scanning request message, the scanning response message including parameters related to an allowed scan duration, an allowed interleaving interval, a scan report mode, and an allowed scan iteration, wherein the scan report mode, which indicates a channel quality measurement reporting method, is set to '00' when the scan report mode indicates no report, set to '01' when the scan report mode indicates a periodic report, and set to '10' when the scan report mode indicates a event-triggered report.

20 Claims, 4 Drawing Sheets

(56) References Cited

U.S. PATENT DOCUMENTS

| | | | |
|---|---|---|---|
| 5,459,873 | A | 10/1995 | Moore et al. |
| 5,509,051 | A | 4/1996 | Barnett et al. |
| 5,519,706 | A | 5/1996 | Bantz et al. |
| 5,566,366 | A | 10/1996 | Russo et al. |
| 5,737,705 | A | 4/1998 | Ruppel et al. |
| 5,754,956 | A | 5/1998 | Abreu et al. |
| 6,075,989 | A | 6/2000 | Moore et al. |
| 6,173,181 | B1 | 1/2001 | Losh |
| 6,385,460 | B1 | 5/2002 | Wan |
| 6,408,172 | B1 | 6/2002 | Alperovich et al. |
| 6,810,251 | B2 | 10/2004 | Hassan et al. |
| 6,985,733 | B2 | 1/2006 | Binzel |
| 7,050,802 | B2 | 5/2006 | Dent |
| 7,133,677 | B2 | 11/2006 | Feder et al. |
| 7,215,956 | B2 | 5/2007 | Liu et al. |
| 7,224,683 | B1 | 5/2007 | Marque-Pucheu et al. |
| 7,260,405 | B2 | 8/2007 | Kim et al. |
| 7,336,953 | B2 | 2/2008 | Kim et al. |
| 7,430,418 | B2 | 9/2008 | Kang et al. |
| 7,460,867 | B2 | 12/2008 | Kim et al. |
| 7,489,930 | B2 | 2/2009 | Aerrabotu et al. |
| 8,331,933 | B2 | 12/2012 | Koo et al. |
| 2003/0003910 | A1 | 1/2003 | McClure |
| 2004/0219926 | A1* | 11/2004 | Kim et al. ............... 455/452.2 |
| 2005/0159166 | A1 | 7/2005 | Jonsson et al. |
| 2007/0004430 | A1 | 1/2007 | Hyun et al. |
| 2007/0060048 | A1 | 3/2007 | Kang et al. |
| 2007/0149230 | A1 | 6/2007 | Song et al. |
| 2010/0246433 | A1 | 9/2010 | Kim et al. |
| 2011/0319077 | A1 | 12/2011 | Nguyen et al. |

FOREIGN PATENT DOCUMENTS

| | | |
|---|---|---|
| CN | 1391414 | 1/2003 |
| JP | 2000-287256 | 10/2000 |
| JP | 2003-283506 | 10/2003 |
| KR | 10-1998-0085646 | 12/1998 |
| KR | 10-2000-0019061 | 4/2000 |
| KR | 10-2005-0045223 | 5/2005 |
| WO | 9512932 | 5/1995 |
| WO | 9943178 | 8/1999 |
| WO | 2004/079949 | 9/2004 |

OTHER PUBLICATIONS

S. Kim et al., "Overall HO Procedures for IEEE 802.16", IEEE 802.16 Broadband Wireless Access Working Group, IEEE C802.16e-03/47, Sep. 2003.

S. Kim et al., "IEEE 802.16e Reporting of Scanning Result", IEEE 802.16 Broadband Wireless Access Working Group, IEEE 802.16e-03/30, May 2003.

K. Cho et al., "A Method of Scanning Neighbor BSs Periodically—HO Ad-Hoc Consensus Contribution", IEEE 802.16 Broadband Wireless Access Working Group, IEEE C802.16e-04/157, Jun. 2004, XP-003005146.

Intellectual Property Office of India Application Serial No. 7476/DELNP/2006, Office Action dated Dec. 17, 2013, 2 pages.

United States Patent and Trademark Office U.S. Appl. No. 13/425,320, Office Action dated Nov. 20, 2013, 7 pages.

* cited by examiner

SCANNING NEIGHBORING BASE STATIONS IN WIRELESS ACCESS SYSTEM

CROSS-REFERENCE TO RELATED APPLICATIONS

This application is a continuation of U.S. patent application Ser. No. 12/813,427, filed on Jun. 10, 2010, now U.S. Pat. No. 8,175,595, which is a continuation of U.S. patent application Ser. No. 11/695,183, filed on Apr. 2, 2007, now U.S. Pat. No. 7,751,817, which is a continuation of U.S. patent application Ser. No. 11/146,530, filed on Jun. 6, 2005, now U.S. Pat. No. 7,460,867, which claims the benefit of earlier filing date and right of priority to Korean Patent Application Nos. 10-2004-0041541, filed on Jun. 7, 2004, and 10-2004-0046708, filed on Jun. 22, 2004, the contents of which are all hereby incorporated by reference herein in their entirety.

FIELD OF THE INVENTION

The present invention relates generally to a wireless access system, and more particularly to scanning neighboring base stations in a wireless access system.

BACKGROUND OF THE INVENTION

The IEEE802.16e system is part of a global standardization for broadband wireless access systems. IEEE802.16e does not have a hierarchical structure of HLR, VLR, MSC, BSC, RNC, etc. unlike second and third generation mobile communications systems, but does include a mobile subscriber station (MSS), a base station (BS), and an authentication service authorization server (ASA server). A physical (PHY) layer and a medium access control (MAC) layer are defined between the BS and the MSS.

FIG. 1 is a block diagram illustrating a related art broadband wireless access system in which a handover operation is performed on a data plane. FIG. 2 is a block diagram illustrating a related art broadband wireless access system in which a handover operation is performed on a control plane.

Referring to FIG. 1 and FIG. 2, a handover in a broadband wireless access system is performed according to IEEE802.16e, as explained below.

1. Pre-Processing for Handover

Pre-processing for handover includes broadcasting associated information from a base station to a neighboring base station to inform all mobile subscriber stations within a respective cell of the associated information (Network Topology Advertisement). The pre-processing also includes measuring a channel quality of the neighboring base station based on the associated information (MSS Scanning of Neighboring BS). The pre-processing also includes matching parameters between the base station and the neighboring base station, such as for example, an initial mobile subscriber station power, a time difference for synchronization, and other parameters (Association Procedures).

a. Network Topology Advertisement

In network topology advertisement, the base station broadcasts information associated with network configuration to all mobile subscriber stations within a cell via a MOB_NBR-ADV MAC message, thereby providing all mobile subscriber stations within the cell with the information pertaining to neighboring base stations.

b. MSS Scanning of Neighboring BS

In MSS scanning of neighboring BS, a mobile subscriber station (MSS) scans a neighboring base station (BS) and requests a scanning interval for scanning the neighboring BS from the BS via a MOB_SCN-REQ MAC message. The BS then transmits a MOB_SCN-RSP MAC message in response to the request to assign an interval for scanning (scanning interval) the neighboring BS. Alternatively, the BS may directly transmit the MOB_SCN_RSP MAC message without a request from the MSS (unsolicited response). In the case of an unsolicited response, the scanning interval and an offset unit for scanning start are assigned on a frame unit basis.

c. Association Procedures

During association procedures, the MSS performs a ranging process with a BS to normally join a cell. In the ranging process, the MSS acquires basic information for communications from the BS. In other words, the MSS performs BS scanning to select a new BS and then performs the association procedures. The MSS and the BS transmit a RNG_REQ MAC message and a RNG_RSP MAC message, respectively, to set values such as for example, a power offset value, a timing offset value, and other values of the MSS to suitable values. Transmission of the RNG_REQ MAC message is called an initial ranging operation and is a basic operation that the MSS may perform in a network entry procedure. When a handover is performed, a target BS accepts a new MSS and transmits items associated with the respective cell of the new MSS to the former serving BS and stores information pertaining to the MSS.

2. Handover Process

In a handover (HO) process, the MSS initiates handover with the neighboring BS based on the channel quality information acquired in the handover pre-processing.

a. Cell Selection

FIG. 3 is a diagram illustrating a related art cell selection procedure in a related art broadband wireless access system. In a cell selection procedure, a cell is changed to enable the MSS to make a new registration to a BS, allowing for reception of a signal having an SINR (signal to interference noise ratio) superior to that of a signal transmitted from the BS of the current cell, prior to a normal registration of the MSS to a cell. In such case, since the MSS does not perform the registration procedure, the BS is unable to determine a moving situation of the MSS.

b. HO (handover) Initiation

In HO initiation, a handover may be initiated by the MSS or the BS. When the BS requests (initiates) a handover, the BS transmits a MOB_BSHO-REQ MAC message to the MSS. On the contrary, when the MSS requests a handover, the MSS transmits a MOB_MSSHO-REQ MAC message to the BS.

If the MSS transmits the MOB_MSSHO-REQ MAC message, the MSS preferentially transmits the SINR of a signal received from a neighboring BS to the BS to enable the MOB_MSSHO-REQ MAC message to be transmitted to a current serving BS. The current serving BS then selects a candidate BS as a target BS for performing the handover.

In a case where the BS receives the MOB_MSSHO-REQ MAC message from the MSS or in a case when the BS has not yet transmitted the MOB_BSHO-REQ MAC message to handover the MSS, the BS may allow the handover of the MSS after confirmation of an acknowledgement (ACK) for handing over a specific MSS from the neighboring BS. After receiving the MOB_BSHO/MSSHO-REQ MAC message, the MSS/BS transmits a MOB_MSSHO/BSHO-RSP MAC message to inform the BS/MSS of a target BS for the handover.

c. HO Cancellation

In HO cancellation, after the MSS/BS transmits the MOB_MSSHO/BSHO-REQ MAC message, the MSS may cancel the handover. In canceling the HO, the MSS sets a specific field (HO_Type=01) of a MOB_HO-IND MAC message and transmits the set field to the BS. The BS receives the message and cancels the proceeding handover.

d. Termination with the Serving BS

In termination with the serving BS, the MSS transmits the MOB_HO-IND MAC message to inform the serving BS that the handover is normally completed and then completes the handover operation. In completing the handover operation, the MSS sets a specific field (HO_Type=00) of the MOB_HO-IND MAC message to transmit the information pertaining to the normal handover termination to the serving BS. The serving BS receives the MOB_HO-IND MAC message from the MSS and terminates a MAC state machine allocated to the MSS. The serving BS also terminates an ARQ (automatic repeat request) connection and all connections associated with data transmission.

e. HO Rejection

In HO rejection, the MSS is capable of rejecting a handover recommended by the BS. In rejecting a handover, the MSS sets a specific field (HO_Type=10) of the MOB_HO-IND MAC message and transmits the message to the BS. The BS receives the rejection message from the MSS, re-seeks for a target BS and re-transmits the MOB_BSHO-RSP MAC message to the MSS.

3. Neighboring BS Scanning Procedure

FIG. 4 is a diagram illustrating a related art neighboring base station scanning procedure. Referring to FIG. 4, a serving BS connected to an MSS broadcasts information pertaining to neighboring BSs to all MSSs within a BS domain.

The information pertaining to the neighboring BSs is delivered via a MOB-NBR-ADV message. A configuration of the MOB-NBR-ADV message is shown in Table 1.

TABLE 1

| Syntax | Size | Notes |
| --- | --- | --- |
| MOB-NBR-ADV_Message_Format( ){ | | |
| Management Message Type = 49 | 8 bits | |
| Operator ID | 24 bits | Unique ID assigned to the operator |
| N_NEIGHBORS | 8 bits | |
| For(j=0; j<N_NEIGHBORS; J++){ | | |
| Neighboring BS-ID | 48 bits | |
| Physical Frequency | 32 bits | |
| Configuration Change Count | 8 bits | |
| Hysteresis threshold | 8 bits | |
| MAHO report period | 8 bits | |
| TVL Encoded Neighbor information | Variable | TLV specific |
| } | | |
| } | | |

Referring to Table 1, the MOB-NBR-ADV message includes a neighboring BS number, a neighboring BS identifier, a neighboring BS frequency, neighboring BS channel information, and other information.

After the MSS receives the MOB-NBR-ADV message, the MSS temporarily stops receiving data transmitted from the serving BS and transmits a MOB-SCN-REQ message for acquiring a time for channel quality measurement from the neighboring BS to the BS. A configuration of the MOB-SCN-REQ message is shown in Table 2.

TABLE 2

| Syntax | Size | Notes |
| --- | --- | --- |
| MOB_SCN_REQ_Message_format( ){ | | |
| Management Message Type = 50 | 8 bits | |

TABLE 2-continued

| Syntax | Size | Notes |
| --- | --- | --- |
| Scan Duration | 12 bits | Units are frames |
| Reserved | 4 bits | |
| } | | |

While the MSS measures channel qualities of the neighboring BSs, the serving BS stops transmitting data to the MSS is then able to transmit data after receiving a scanning duration request from the MSS. The serving BS transmits a MOB-SCN-RSP message to the MSS in response to the MOB-SCN-REQ message. A configuration of the MOB-SCN-REQ message is shown in Table 3.

TABLE 3

| Syntax | Size | Notes |
| --- | --- | --- |
| MOB_SCN_RSP_Message_format( ){ | | |
| Management Message Type = 50 | 8 bits | |
| Scan Duration | 12 bits | Units are frames |
| Start Frame | 4 bits | |
| } | | |

As shown in the MOB-SCN-REQ message, the BS secures the scanning duration requested by the MSS, and the MSS starts the BS scanning after standing by for a start frame time.

The related art neighboring BS scanning method has several problems and disadvantages. In order to provide a seamless service from the BS, a moving MSS may request the handover. Alternatively, the BS may request the handover in order to balance its load. If the BS requests the handover, the MSS performs scanning on neighboring BSs to decide whether to perform the handover. If the handover is needed, the neighboring BSs must be continuously scanned. However, in order to obtain channel quality information in the related art method, the MSS must transmit the scanning request message and receive the corresponding scanning response message each time. Hence, the MSS continually occupies limited radio resources and unnecessarily consumes power for message transmission and reception.

SUMMARY OF THE INVENTION

Accordingly, the present invention is directed to scanning neighboring base stations in a wireless access system that substantially obviates one or more problems of the related art.

An object of the present invention is to provide a neighboring BS scanning method in which an mobile subscriber station (MSS) efficiently measures a quality of a physical channel required for a handover and transmits a corresponding result to a base station (BS).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method of scanning neighboring base stations for assessing channel quality in a wireless communication system includes receiving from a serving base station information associated with at least one neighboring base station, and transmitting a scanning request message from a mobile subscriber station to the serving base station, wherein the scanning request message comprises a requested scan duration and a requested scan iteration, the requested scan iteration being associated with a requested number of iterations of the scanning of the at least one neighboring base station. The method also includes receiving a scanning response message from the serving base station, wherein the scanning response message comprises an allowed scan duration and an allowed scan iteration, the allowed scan iteration being associated with an allowed number of iterations of the scanning of the at least one neighboring base station.

The scanning request message may preferably further comprise a requested interleaving interval associated with a requested time period between each scan. The scanning response message may preferably further comprise an allowed interleaving interval associated with an allowed time period between each scan.

During each of the allowed interleaving interval the serving base station and the mobile subscriber station may preferably be in a normal operation mode. If the mobile subscriber station transmits any data to the serving base station during the allowed scan duration then the scanning of the at least one neighboring base station may preferably be terminated.

The requested scan duration may preferably be associated with a requested time period in which the mobile subscriber station initiates and terminates the scanning of the at least one neighboring base station. The allowed scan duration may preferably be associated with an allowed time period in which the mobile subscriber station initiates and terminates the scanning of the at least one neighboring base station.

The scanning response message from the serving base station may further comprise a scan report mode, wherein the scan report mode is associated with a reporting frequency of the mobile subscriber station to the serving base station. The scan report mode may preferably comprise at least one of (1) no report, (2) periodic report, and (3) event triggered report. The mobile subscriber station may preferably transmit a scan report to the serving base station in response to the scan report mode.

The allowed scan duration and the allowed scan iteration may preferably be determined by the serving base station in response to the requested scan duration and the requested scan iteration and a network load.

In another embodiment, a method of scanning neighboring base stations for assessing channel quality in a wireless communication system, includes receiving from a serving base station information associated with at least one neighboring base station, and receiving a scanning response message from the serving base station, wherein the scanning response message comprises a scan duration and a scan iteration, the scan iteration being associated with a number of iterations of the scanning of the at least one neighboring base station.

In yet another embodiment, a method of scanning neighboring base stations for assessing channel quality in a wireless communication system includes transmitting to a mobile subscriber station information associated with at least one neighboring base station, and transmitting a scanning response message from a serving base station, wherein the scanning response message comprises an allowed scan duration and an allowed scan iteration, the allowed scan iteration being associated with an allowed number of iterations of the scanning of the at least one neighboring base station. The method may preferably also include receiving a scanning request message from a mobile subscriber station to the serving base station before transmitting the scanning response message, wherein the scanning request message comprises a requested scan duration and a requested scan iteration, the requested scan iteration being associated with a requested number of iterations of the scanning of the at least one neighboring base station.

It is to be understood that both the foregoing general description and the following detailed description of the present invention are exemplary and explanatory and are intended to provide further explanation of the invention as claimed.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Figure 1:
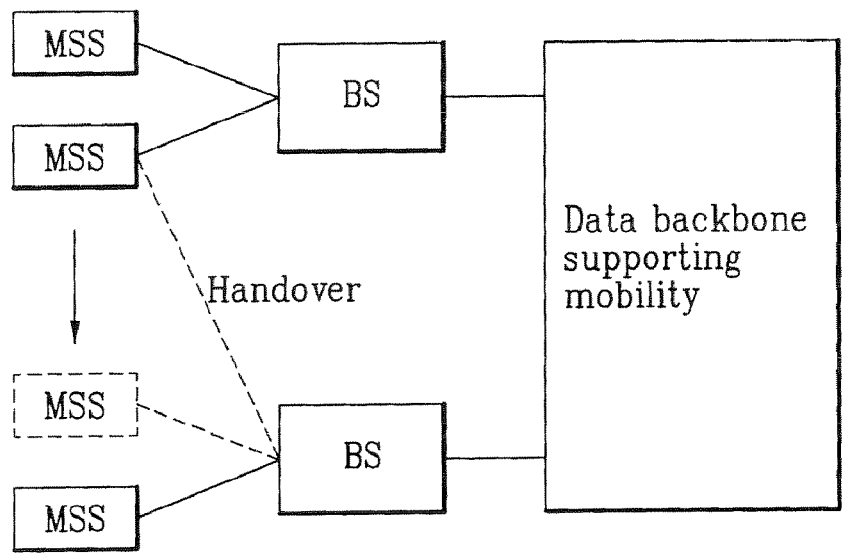
FIG. 1 is a block diagram illustrating a broadband wireless access system in which a handover operation is performed on a data plane.
Figure 2:
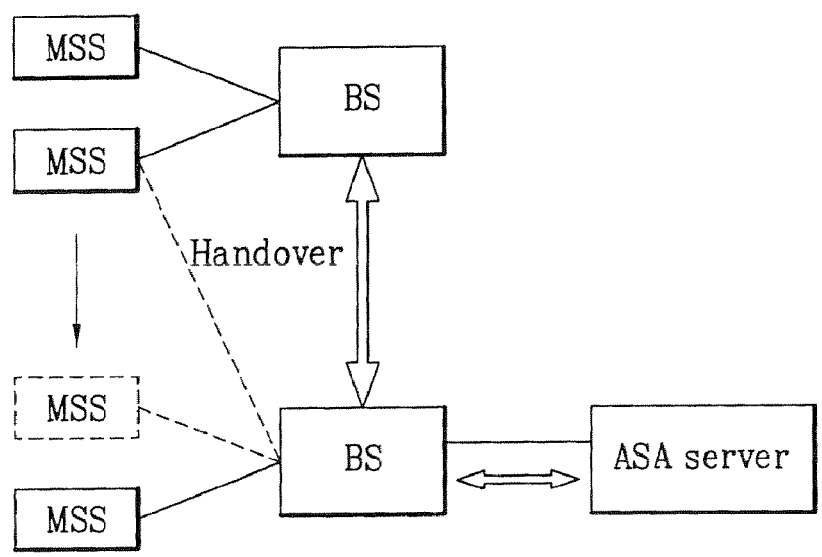
FIG. 2 is a block diagram illustrating a broadband wireless access system in which a handover operation is performed on a control plane.
Figure 3:
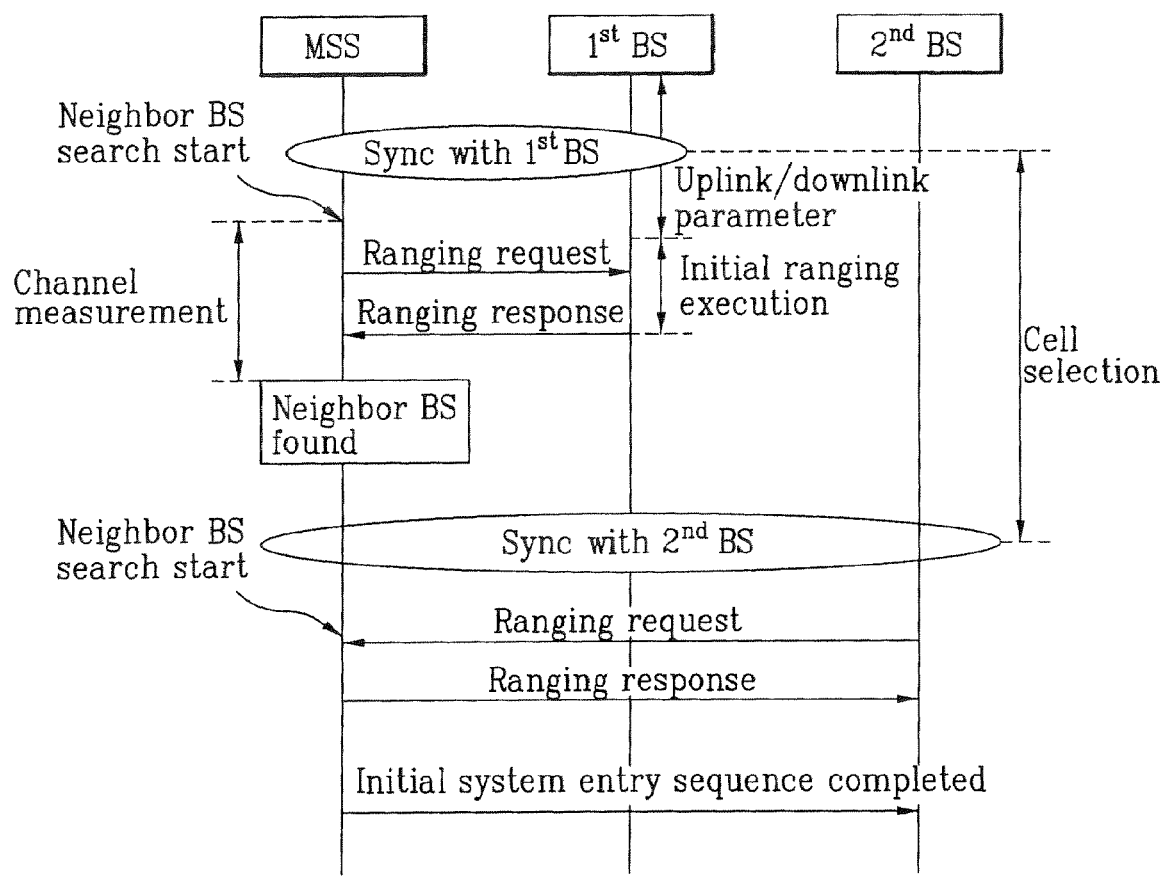
FIG. 3 is a diagram illustrating a cell selection procedure in a broadband wireless access system.
Figure 4:
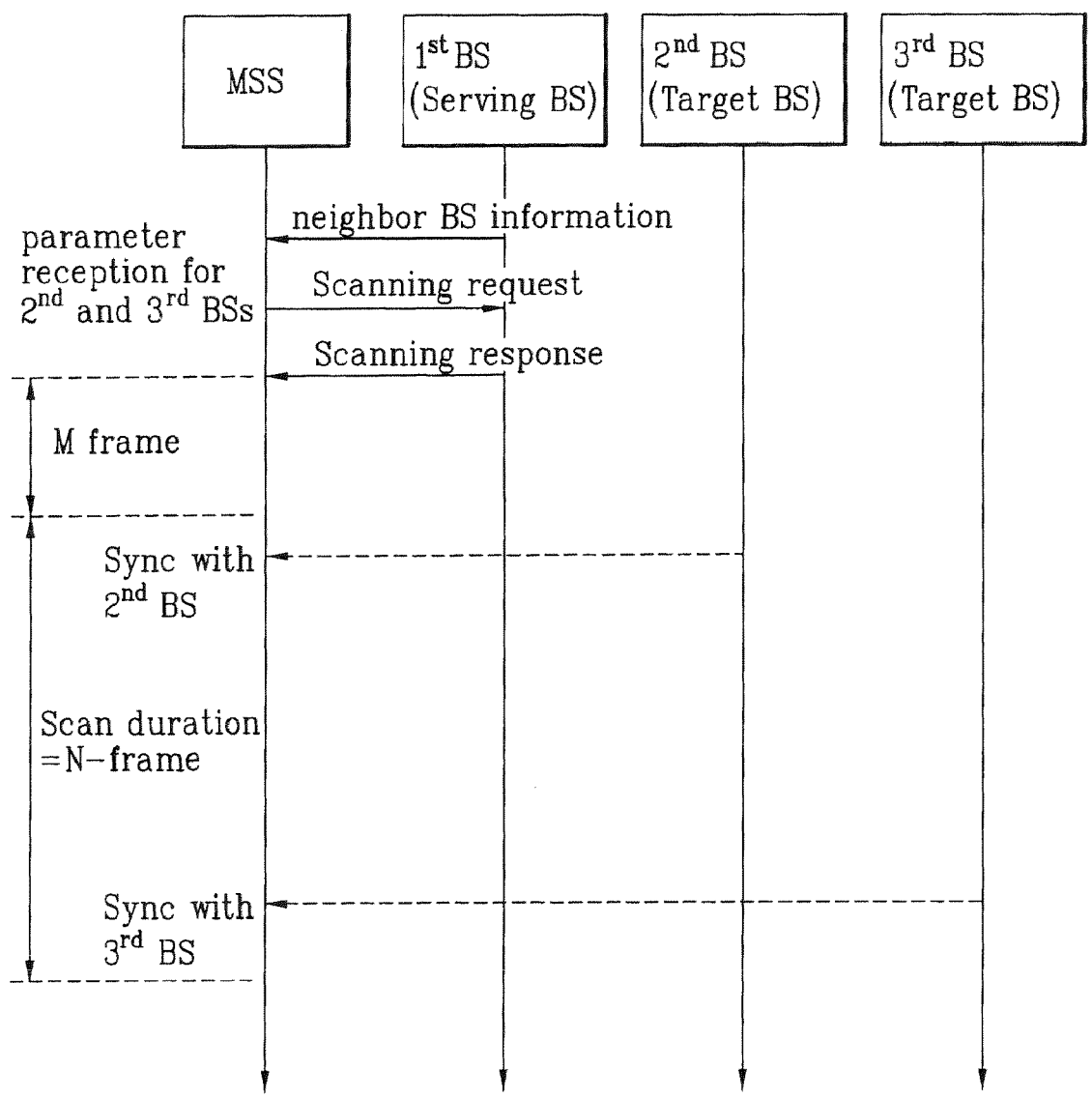
FIG. 4 is a diagram illustrating a neighboring base station scanning procedure.

Reference will now be made in detail to the preferred embodiments of the present invention, examples of which are illustrated in the accompanying drawings. Wherever possible, the same reference numbers will be used throughout the drawings to refer to the same or like parts.

In one embodiment, a request to perform a scan for channel quality measurement (scanning request message) of neighboring base stations is sent to a serving base station (BS). A mobile subscriber station (MSS) transmits a cycle and an iteration count for performance of the scan (scanning) to the serving BS to enable periodic scanning. In periodic scanning of the neighboring BSs, the cycle for performing the scanning may correspond to a time between scan execution intervals. The time between scan execution intervals may be, for example, a general interleaving interval for transmitting data between the MSS and the serving BS. The cycle for performing the scanning is called a normal operation interval (interleaving interval). During the normal operation interval, the MSS and the serving BS may communicate traffic data. Information pertaining to channel quality (channel quality information) measured by the MSS may include a signal to interference noise ratio (SINR) from a neighboring BS, a bit error rate, a quality of service identifier, and other information.

An exemplary configuration of a scanning request message (scan request message) is shown in Table 4.

TABLE 4

| Syntax | Size | Notes |
|---|---|---|
| MOB_SCN_REQ_Message_format( ){ | | |
| Management Message Type = 50 | 8 bits | |
| Scan Duration | 12 bits | Units are frames |
| Interleaving Interval | X bits | |
| Scan Iteration | Y bits | |
| } | | |

Referring to Table 4, the MSS transmits information for periodic scan execution to the serving BS using a scanning request message. The scanning request message may include information pertaining to a length of a scanning duration (scan duration), a time to start the scanning (start frame), a count of iterated scanning (scan iteration), and a general function execution interval (interleaving interval). In response to receipt of the scanning request message, the serving BS transmits a scanning response message to the MSS.

An exemplary configuration of the scanning response message is shown in Table 5.

TABLE 5

| Syntax | Size | Notes |
|---|---|---|
| MOB_SCN_RSP_Message_format( ){ | | |
| Management Message Type = 50 | 8 bits | |
| Scan Duration | 12 bits | Units are frames |
| Start Frame | 4 bits | |
| Interleaving Interval | X bits | |
| Scan Iteration | Y bits | |
| } | | |

Referring to Table 5, the serving BS transmits the scanning response message to the MSS in response to receipt of the scanning request message. The scanning response message may include information pertaining to a length of a scanning duration (scan duration), a time to start the scanning (start frame), a count of iterated scanning (scan iteration), and a general function execution interval (interleaving interval).

The MSS periodically measures the channel quality of the neighboring BSs based on the information included in the scanning response message transmitted from the serving BS. In another embodiment, the information pertaining to the length of a scanning duration (scan duration), the time to start the scanning (start frame), the count of iterated scanning (scan iteration), and the general function execution interval (interleaving interval) are transmitted by the BS to the MSS in response to the request from the MSS. Alternatively, the information pertaining to the length of a scanning duration (scan duration), the time to start the scanning (start frame), the count of iterated scanning (scan iteration), and the general function execution interval (interleaving interval) may be transmitted by the serving BS to the MSS without a request from the MSS (unsolicited response).

Figure 5:
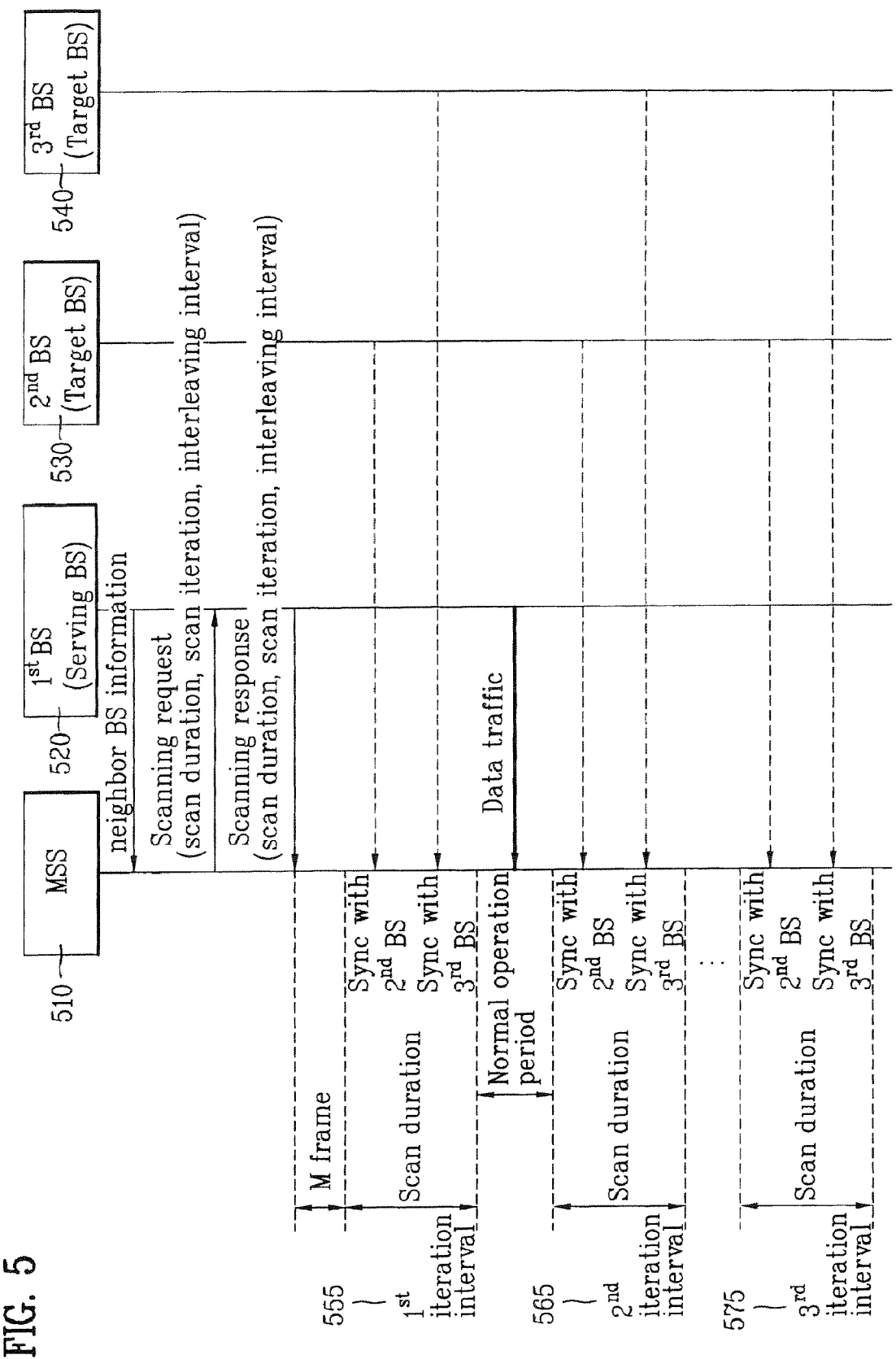
FIG. 5 is a diagram illustrating a neighboring base station scanning procedure, according to one embodiment of the present invention.

FIG. 5 is a diagram illustrating a neighboring base station scanning procedure, according to one embodiment of the present invention. Referring to FIG. 5, in one embodiment, a 1st BS (serving BS) 520 may preferably store the data rather than transmit the data to an MSS 510 during a scanning duration (scan duration), such as the scan durations related to the $1^{st}$ $2^{nd}$, and $3^{rd}$ iteration intervals 555, 565, and 575, respectively, in which the MSS 510 is measuring channel quality of neighboring BSs (target BSs), i.e. the $2^{nd}$ BS 530 and the $3^{rd}$ BS 540. The serving BS 520 may then transmit the stored data during an interval in which the MSS 510 is not scanning the neighboring BSs 530 and 540, i.e., during a general function execution interval (interleaving interval).

In another embodiment, if a data transmission time is prolonged such that the data transmission is not completed by a new scanning start time (start frame) of the MSS 510, the serving BS 520 may ignore the scanning start time and continue transmitting the data. Alternatively, the data transmission may be stopped to allow for the new scanning start time. In such case where the data transmission is stopped, the data transmission may be restarted after the scanning duration of the MSS 510 ends.

In yet another embodiment, if the serving BS 520 ignores the scanning start time of the MSS 510 and continues transmitting the data, the MSS 510 may stop performing scanning in response to a determination by the MSS 510 that the scanning duration, the general function execution interval (interleaving interval), and the scanning iteration count assigned by the serving BS 520 via the scanning response message are no longer valid. Also, in such case where the serving BS 520 ignores the scanning start time of the MSS 510 and continues transmitting the data, data and scanning procedures received from the serving BS 520 which relate to an iteration count that has not been executed may then be executed. Alternatively, the MSS 510 may continue scanning during the data transmission from the serving BS 520, thereby enabling the MSS 510 to perform scanning during the entire scanning duration (scan duration×scan iteration) initially assigned by the serving BS 520.

In still another embodiment, the serving BS 520 may use a result of neighboring (target) BS channel quality measurement acquired from scanning by the MSS 510 to determine whether to command execution of the handover to the MSS 510. In this case, the serving BS 520 may request the neighboring BS channel quality measurement from the MSS 510 to determine whether it is necessary to perform the handover. The serving BS 520 may also command execution of the handover to the MSS 510 to adjust the network load of the serving BS 520.

In yet another embodiment, the channel quality measurement request from the serving BS 520 to the MSS 510 may be initiated based on necessity of the serving BS 520. In this case, the MSS 510 transmits the result of neighboring BS channel quality measurement (channel quality measurement result) to the requesting (serving) BS 520. For example, the MSS 510 may preferably send parameters including requested scan iteration, interleaving interval, and scan duration to the serving base station 520. The serving BS 520 may use these received parameters in combination with the scheduling and data buffer capabilities of the serving BS 520. Alternatively, the serving BS 520 may change the parameters. The transmission of the channel quality measurement result may be executed by periodically reporting the channel quality measurement result regardless of the time point or cycle of the measurement. Alternatively, the channel quality measurement result may be reported each time the MSS 510 measures the channel qualities. The measurement reporting method of the MSS 510 may be selected by the serving BS 520 or the MSS 510.

An exemplary configuration of a scanning response message including the information pertaining to the selection is shown in Table 6.

TABLE 6

| Syntax | Size | Notes |
| --- | --- | --- |
| MOB-SCN-RSP_Message_Format( ){ | | |
| Management Message Type = 50 | 8 bits | |
| Scan Duration | 12 bits | Units are frames |
| Start Frame | 4 bits | |
| Interleaving Interval | X bits | |
| Scan Iteration | Y bits | |
| Scan Report Mode | 2 bits | 00: no report |
| | | 01: periodic report |
| | | 10: event triggered report |
| | | 11: reserved |
| Scan Report Period | Z bits | Available when the value of Scan Report is set to 01 |
| } | | |

The MSS may preferably report the channel quality measurement result according to an identifier of the scanning response message received from the serving BS at each measurement. Alternatively, the MSS may preferably report the channel quality measurement result according to an identifier of the scanning response message received from the serving BS periodically. In the case of reporting the channel quality measurement result periodically, a separate measurement result report period may be set. Alternatively, the MSS may not report the channel quality measurement result.

In one embodiment, the MSS is not required to send a confirm message in response to receiving the scanning response message from the serving BS. For example, if the MSS performs an action different from that commanded by the serving BS, the serving BS may determine that the scanning response message is incorrect and send another scanning response message.

When a message requesting a new scanning and report is received from the target BS while the target BS is in the process of reporting a scanning result to the serving BS, the MSS may ignore all current scanning and report procedures and may perform a scanning and report procedure according to the new request message.

Periodically repeated scan duration and interleaving intervals that enable data transmission and/or reception may be interrupted by a request from the serving BS. When the serving BS requests such an interruption, the serving BS may fill a specific entry (scan duration, interleaving interval, scan iteration) in the scanning response message shown in Table 5 with a specific value, e.g., 0, for notification purposes. Furthermore, repeated scan duration and interleaving intervals that enable data transmission and/or reception may also be interrupted by a request from the MSS. When the MSS requests such an interruption, the MSS may fill a specific entry (scan duration, interleaving interval, scan iteration) in the scanning request message shown in Table 4 with a specific value, e.g., 0, for notification purposes.

In one embodiment, a method of scanning neighboring base stations for assessing channel quality in a wireless communication system includes receiving from a serving base station information associated with at least one neighboring base station, and transmitting a scanning request message from a mobile subscriber station to the serving base station, wherein the scanning request message comprises a requested scan duration and a requested scan iteration, the requested scan iteration being associated with a requested number of iterations of the scanning of the at least one neighboring base station. The method also includes receiving a scanning response message from the serving base station, wherein the scanning response message comprises an allowed scan duration and an allowed scan iteration, the allowed scan iteration being associated with an allowed number of iterations of the scanning of the at least one neighboring base station.

The scanning request message may preferably further comprise a requested interleaving interval associated with a requested time period between each scan. The scanning response message may preferably further comprise an allowed interleaving interval associated with an allowed time period between each scan.

During each of the allowed interleaving interval the serving base station and the mobile subscriber station may preferably be in a normal operation mode. If the mobile subscriber station transmits any data to the serving base station during the allowed scan duration then the scanning of the at least one neighboring base station may preferably be terminated.

The requested scan duration may preferably be associated with a requested time period in which the mobile subscriber station initiates and terminates the scanning of the at least one neighboring base station. The allowed scan duration may preferably be associated with an allowed time period in which the mobile subscriber station initiates and terminates the scanning of the at least one neighboring base station.

The scanning response message from the serving base station may further comprise a scan report mode, wherein the scan report mode is associated with a reporting frequency of the mobile subscriber station to the serving base station. The scan report mode may preferably comprise at least one of (1) no report, (2) periodic report, and (3) event triggered report. The mobile subscriber station may preferably transmit a scan report to the serving base station in response to the scan report mode.

The allowed scan duration and the allowed scan iteration may preferably be determined by the serving base station in response to the requested scan duration and the requested scan iteration and a network load.

In another embodiment, a method of scanning neighboring base stations for assessing channel quality in a wireless communication system, includes receiving from a serving base station information associated with at least one neighboring base station, and receiving a scanning response message from the serving base station, wherein the scanning response message comprises a scan duration and a scan iteration, the scan iteration being associated with a number of iterations of the scanning of the at least one neighboring base station.

In yet another embodiment, a method of scanning neighboring base stations for assessing channel quality in a wireless communication system includes transmitting to a mobile subscriber station information associated with at least one neighboring base station, and transmitting a scanning response message from a serving base station, wherein the scanning response message comprises an allowed scan duration and an allowed scan iteration, the allowed scan iteration being associated with an allowed number of iterations of the scanning of the at least one neighboring base station. The method may preferably also include receiving a scanning request message from a mobile subscriber station to the serving base station before transmitting the scanning response message, wherein the scanning request message comprises a requested scan duration and a requested scan iteration, the requested scan iteration being associated with a requested number of iterations of the scanning of the at least one neighboring base station.

Accordingly, the MSS performs scanning of neighboring BSs in a wireless access system without repeatedly transmitting or receiving the scanning request or response messages.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for scanning neighboring base stations for measuring channel quality in a wireless communication system, the method comprising:
receiving, by a mobile subscriber station, information associated with at least one neighboring base station;
transmitting, by the mobile subscriber station, a scanning request message to request a scanning interval, the scanning request message including parameters related to a requested scan duration, a requested interleaving interval, and a requested scan iteration; and
receiving, by the mobile subscriber station, a scanning response message in response to the scanning request message, the scanning response message including parameters related to an allowed scan duration, an allowed interleaving interval, a scan report mode, and an allowed scan iteration,
wherein the allowed interleaving interval indicates a period interleaved between allowed scan durations when the mobile subscriber station performs a normal operation, and
wherein the scan report mode indicates one of no report, a periodic report, or an event-triggered report.

2. The method according to claim 1, further comprising:
performing a channel quality measurement according to the scan report mode; and
reporting a result of the channel quality measurement.

3. The method according to claim 2, wherein the scanning response message further includes a report period parameter indicating a period for reporting the result of the channel quality measurement, and the report period parameter is available when the scan report mode indicates the periodic report.

4. The method according to claim 3, wherein the result of the channel quality measurement is reported with the period according to the report period parameter when the scan report mode indicates the periodic report.

5. The method according to claim 2, wherein the result of the channel quality measurement is reported after each channel quality measurement when the scan report mode indicates the event-triggered report.

6. A method for scanning neighboring base stations for measuring channel quality in a wireless communication system, the method comprising:
transmitting, by a base station, information associated with at least one neighboring base station to a mobile subscriber station;
receiving, by the base station, a scanning request message requesting a scanning interval, the scanning request message including parameters related to a requested scan duration, a requested interleaving interval, and a requested scan iteration; and
transmitting, by the base station, a scanning response message in response to the scanning request message, the scanning response message including parameters related to an allowed scan duration, an allowed interleaving interval, a scan report mode, and an allowed scan iteration,
wherein the allowed interleaving interval indicates a period interleaved between allowed scan durations when the mobile subscriber station performs a normal operation, and
wherein the scan report mode indicates one of no report, a periodic report, or an event-triggered report.

7. The method according to claim 6, further comprising:
receiving a report of a result of a channel quality measurement which has been performed by the mobile subscriber station according to the scan report mode.

8. The method according to claim 7, wherein the scanning response message further includes a report period parameter indicating a period for reporting the result of the channel quality measurement, and the report period parameter is available when the scan report mode indicates the periodic report.

9. The method according to claim 8, wherein the report is received with the period according to the report period parameter when the scan report mode indicates the periodic report.

10. The method according to claim 7, wherein the report, which is received when the channel quality measurement is performed by the mobile subscriber station, is received after each channel quality measurement if the scan report mode indicates the event-triggered report.

11. A mobile subscriber station for scanning neighboring base stations for measuring channel quality in a wireless communication system, the mobile subscriber station comprising:
a transmission module; and
a reception module,
wherein the mobile subscriber station is configured to:
receive, via the reception module, information associated with at least one neighboring base station;
transmit, via the transmission module, a scanning request message to request a scanning interval, the scanning request message including parameters related to a requested scan duration, a requested interleaving interval, and a requested scan iteration; and
receive, via the reception module, a scanning response message in response to the scanning request message, the scanning response message including parameters related to an allowed scan duration, an allowed interleaving interval, a scan report mode, and an allowed scan iteration,
wherein the allowed interleaving interval indicates a period interleaved between allowed scan durations when the mobile subscriber station performs a normal operation, and
wherein the scan report mode indicates one of no report, a periodic report, or an event-triggered report.

12. The mobile subscriber station according to claim 11, wherein the mobile subscriber station is further configured to:
perform a channel quality measurement according to the scan report mode; and
report a result of the channel quality measurement.

13. The mobile subscriber station according to claim 12, wherein the scanning response message further includes a report period parameter indicating a period for reporting the result of the channel quality measurement, and the report period parameter is available when the scan report mode indicates the periodic report.

14. The mobile subscriber station according to claim 13, wherein the mobile subscriber station reports with the period according to the report period parameter when the scan report mode indicates the periodic report.

15. The mobile subscriber station according to claim 12, wherein the mobile subscriber station reports the result of the channel quality measurement after each channel quality measurement when the scan report mode indicates the event-triggered report.

16. A base station supporting scanning of neighboring base stations for measuring channel quality in a wireless communication system, the base station comprising:
a transmission module; and
a reception module,
wherein the base station is configured to:
  transmit, via the transmission module, information associated with at least one neighboring base station to a mobile subscriber station;
  receive, via the reception module, a scanning request message requesting a scanning interval, the scanning request message including parameters related to a requested scan duration, a requested interleaving interval, and a requested scan iteration; and
  transmit, via the transmission module, a scanning response message in response to the scanning request message, the scanning response message including parameters related to an allowed scan duration, an allowed interleaving interval, a scan report mode, and an allowed scan iteration,
wherein the allowed interleaving interval indicates a period interleaved between allowed scan durations when the mobile subscriber station performs a normal operation, and
wherein the scan report mode indicates one of no report, a periodic report, or an event-triggered report.

17. The base station according to claim 16, wherein the base station is further configured to:
receive a report of a result of a channel quality measurement which has been performed by the mobile subscriber station according to the scan report mode.

18. The base station according to claim 17, wherein the scanning response message further includes a report period parameter indicating a period for reporting the result of the channel quality measurement, and the report period parameter is available when the scan report mode indicates the periodic report.

19. The base station according to claim 18, wherein the base station receives the report which is transmitted with the period according to the report period parameter when the scan report mode indicates the periodic report.

20. The base station according to claim 17, wherein the base station receives the report, which is received when the channel quality measurement is performed by the mobile subscriber station, after each channel quality measurement if the scan report mode indicates the event-triggered report.

* * * * *